United States Patent
Ruiz

(10) Patent No.: US 7,953,813 B2
(45) Date of Patent: *May 31, 2011

(54) NOTIFICATION SYSTEM AND METHOD FOR DOMAIN NAME OPTIONS

(75) Inventor: Tim Ruiz, Cedar Rapids, IA (US)

(73) Assignee: The Go Daddy Group, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/841,704

(22) Filed: Jul. 22, 2010

(65) Prior Publication Data

US 2010/0287254 A1    Nov. 11, 2010

Related U.S. Application Data

(62) Division of application No. 10/894,168, filed on Jul. 19, 2004, and a division of application No. 12/403,207, filed on Mar. 12, 2009.

(51) Int. Cl.
    *G06F 15/16*    (2006.01)
(52) U.S. Cl. ......................................... 709/206
(58) Field of Classification Search ................. None
    See application file for complete search history.

(56) References Cited

U.S. PATENT DOCUMENTS

| | | | |
|---|---|---|---|
| 6,012,066 A * | 1/2000 | Discount et al. | 1/1 |
| 6,446,118 B1 | 9/2002 | Gottlieb | |
| 6,584,564 B2 | 6/2003 | Olkin et al. | |
| 6,834,306 B1 | 12/2004 | Tsimelzon | |
| 6,871,214 B2 | 3/2005 | Parsons et al. | |
| 7,240,095 B1 | 7/2007 | Lewis | |
| 7,289,971 B1 * | 10/2007 | O'Neil et al. | 705/44 |
| 2002/0023136 A1 | 2/2002 | Silver et al. | |
| 2002/0091827 A1 | 7/2002 | King et al. | |
| 2002/0129013 A1 | 9/2002 | Thomas | |
| 2002/0131561 A1 | 9/2002 | Gifford et al. | |
| 2002/0143564 A1 | 10/2002 | Webb et al. | |
| 2003/0132967 A1 | 7/2003 | Gangadharan | |
| 2003/0208624 A1 | 11/2003 | Grossman | |
| 2004/0098375 A1 | 5/2004 | DeCarlo, III | |
| 2004/0133644 A1 | 7/2004 | Warren et al. | |
| 2004/0167982 A1 | 8/2004 | Cohen et al. | |
| 2004/0181430 A1 | 9/2004 | Fotsch et al. | |
| 2005/0144520 A1 * | 6/2005 | Tuma et al. | 714/15 |
| 2005/0203875 A1 | 9/2005 | Mohammed et al. | |
| 2005/0268237 A1 | 12/2005 | Crane et al. | |

(Continued)

OTHER PUBLICATIONS eBay 2002 Annual Report, pp. 1-13, published 2003.*

(Continued)

*Primary Examiner* — Ario Etienne
*Assistant Examiner* — Clayton R Williams
(74) *Attorney, Agent, or Firm* — Chris A. Watt

(57) ABSTRACT

A system and method of the present invention allow communication via electronic messages between a Customer and a domain name Registrar, avoiding traditional electronic mail (email) communication. Email messages may not be delivered to the Customer for various reasons including the situations where the Customer employs anti-SPAM protective technologies. The system and method of the present invention establish a Communication Link between a Customer's Computer and Registrar's Server, which avoids anti-SPAM protective technologies and email messaging altogether. Information relating to the communication may be stored on a database and the system may present the Customer with various options relating to a domain service. The implementation of this invention would result in a higher rate of delivered messages to the Customer.

10 Claims, 5 Drawing Sheets

U.S. PATENT DOCUMENTS

2006/0171523 A1* 8/2006 Greenwell .................. 379/242

OTHER PUBLICATIONS

Malcolm Moffat, RSS—A Primer for Publihsers & Content Proivders, p. 3.

Mar. 10, 2008 Non-Final Rejection, U.S. Appl. No. 10/877,613 (Publication US 2006-0031330 A1).

Jul. 31, 2008 Response to Mar. 10, 2008 Non-Final Rejection, U.S. Appl. No. 10/877,613 (Publication US 2006-0031330 A1).

Feb. 27, 2009 Final Rejection, U.S. Appl. No. 10/877,613 (Publication US 2006-0031330 A1).

May 22, 2009 Response to Feb. 27, 2009 Final Rejection, U.S. Appl. No. 10/877,613 (Publication US 2006-0031330 A1).

Aug. 19, 2009 Non-Final Rejection, U.S. Appl. No. 10/877,613 (Publication US 2006-0031330 A1).

Oct. 29, 2009 Response to Aug. 19, 2009 Non-Final Rejection, U.S. Appl. No. 10/877,613 (Publication US 2006-0031330 A1).

Mar. 26, 2010 Non-Final Rejection, U.S. Appl. No. 10/877,613 (Publication US 2006-0031330 A1).

Jun. 22, 2010 Response to Mar. 26, 2010 Non-Final Rejection, U.S. Appl. No. 10/877,613 (Publication US 2006-0031330 A1).

Oct. 6, 2009 Non-Final Rejection, U.S. Appl. No. 12/403,207 (Publication US 2009-0177549 A1).

Jan. 4, 2010 Response to Oct. 6, 2009 Non-Final Rejection, U.S. Appl. No. 12/403,207 (Publication US 2009-0177549 A1).

May 14, 2010 Non-Final Rejection, U.S. Appl. No. 12/403,207 (Publication US 2009-0177549 A1).

Jun. 22, 2010 Response to May 14, 2010 Final/Non-Final Rejection, U.S. Appl. No. 12/403,207 (Publication US 2009-0177549 A1).

Oct. 7, 2010 Final Rejection, U.S. Appl. No. 10/894,168 (Publication US 2006-0031330 A1).

Nov. 18, 2010 Response to Oct. 7, 2010 Final Rejection, U.S. Appl. No. 10/894,168 (Publication US 2006-0031330 A1).

Sep. 13, 2010 Final Rejection, U.S. Appl. No. 12/403,207 (Publication US 2009-0177549 A1).

Nov. 18, 2010 Response to Sep. 13, 2010 Final Rejection, U.S. Appl. No. 12/403,207 (Publication US 2009-0177549 A1).

Dec. 23, 2010 Non-Final Rejection, U.S. Appl. No. 10/894,168 (Publication US 2006-0031330 A1).

Feb. 7, 2011 Response to Dec. 23, 2010 Non-Final Rejection, U.S. Appl. No. 10/894,168 (Publication US 2006-0031330 A1).

Dec. 23, 2010 Non-Final Rejection, U.S. Appl. No. 12/403,207 (Publication US 2009-0177549 A1).

Feb. 7, 2011 Response to Dec. 23, 2010 Non-Final Rejection, U.S. Appl. No. 12/403,207 (Publication US 2009-0177549 A1).

Dec. 10, 2010 Non-Final Rejection, U.S. Appl. No. 12/841,704 (Publication US 2010-0287254 A1).

Feb. 7, 2011 Response to Dec. 10, 2010 Non-Final Rejection, U.S. Appl. No. 12/841,704 (Publication US 2010-0287254 A1).

Ebay 2002 Annual Report.

Feb. 24, 2011 Notice of Allowance of U.S. Appl. No. 10/894,168 (Publication US 2006-0031330 A1).

* cited by examiner

NOTIFICATION SYSTEM AND METHOD FOR DOMAIN NAME OPTIONS

CROSS REFERENCE TO RELATED PATENT APPLICATIONS

This divisional application claims the benefit of U.S. patent application Ser. No. 12/403,207 filed on Mar. 12, 2009, which claims the benefit of U.S. patent application Ser. No. 10/894,168 filed on Jul. 19, 2004.

FIELD OF THE INVENTION

The present invention relates, in general, to notification systems and methods and, in particular, to the systems and methods that are used by the domain name registrars for notifying their customers.

BACKGROUND OF THE INVENTION

The Internet is a worldwide network of computers and computer networks arranged to allow the easy and robust exchange of information between the users of the computers. Hundreds of millions of people around the world have access to computers connected to the Internet via an Internet Service Providers (ISPs). Content providers place multimedia information, i.e. text, graphics, sounds, and other forms of data at specific locations on the Internet referred to as websites. The combination of all the websites and their corresponding webpages on the Internet is generally known as the World Wide Web (WWW) or simply web.

Websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER or NETSCAPE NAVIGATOR. After the browser has located the desired webpage, it requests and receives information from the webpage, typically in the form of an HTML document, and then displays the webpage content for the user. The user may then view other webpages at the same website or move to an entirely different website using the browser.

Browsers are able to locate specific websites because each website, resource and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where 8-bit bytes are separated by a dot from each other, e.g. 64.202.167.32. This notation is used to improve human readability. The newer IP address standard, often called IP Version 6 (IPv6) or Next Generation Internet Protocol (IPng), is 128-bit binary number. The standard human readable notation for IPv6 addresses represents the address as eight 16-bit hexadecimal words, each separated by a colon, for example 2EDC:BA98:0332:0000:CF8A:000C:2154:7313.

However, IP addresses, even in a human readable notation, are difficult to remember and use by people. Uniform Resource Locators (URL) are much easier to remember and may be used to point to any computer, website, directory or file on the Internet. A browser is able to access a website on the Internet through the use of a URL. The URL may include a Hypertext Transfer Protocol (HTTP) request combined with the website's Internet address, also known as the website's domain name. An example of a URL with an HTTP request and domain name is: http://godaddy.com. In this example, the "http" identifies the URL as an HTTP request and the "godaddy.com" is the domain name.

Individuals, companies, and other entities that provide content on the web generally want to use their name or one of their trademarks as part of their domain name. Thus, domain names are generally company trademarks, personal names or short phrases concatenated with a top level domain name (TLD) extension (e.g. .com, .net, .org, .us, .biz, etc.). Domain names created in this fashion are much easier to remember and use than their corresponding IP addresses. The Internet Corporation for Assigned Names and Numbers (ICANN) approves all TLDs and delegates the responsibility to a particular organization (hereinafter Registry) for maintaining an authoritative source for the registered domain names within a TLD and their corresponding IP addresses. For certain TLDs, e.g. .biz, .info, .name, the Registry is also the authoritative source for contact information related to the domain name, so called "thick" registry. For other TLDs, e.g. .com, .org, .net, only domain and name server information is stored within the registry, so called "thin" registry, and a Registrar is the authoritative source for the contact information related to the domain name. All domain names are organized through a central domain name Shared Registration System (SRS) based on their TLD. There is only one organization, or Registry, for each of the ICANN approved TLDs.

The process for registering a domain name with a particular Registry allows a Customer to use an ICANN-accredited Registrar. For example if a Customer, John Doe, wishes to register the domain name "JohnDoe.com", John Doe may initially verify whether the desired domain name is or is not available by contacting a Registrar. The Customer may make this contact using the Registrar's webpage and typing the desired domain name into a field in the Registrar's webpage created for this purpose. Upon receiving the request from the Customer, the Registrar may ascertain whether "JohnDoe.com" has already been registered by checking the SRS database of the Registry associated with the TLD of the domain name. The results of the search may then be displayed on the webpage to thereby notify the Customer of the availability of the domain name. If the domain name is available, the Customer may proceed with the registration process. Otherwise, the Customer will have to keep selecting alternative domain names until an available domain name is found in order to get a registered domain name.

After a domain name is registered, fees must be periodically paid to maintain the domain name registration. The fees help to pay the Registrar and Registry for the hardware and software necessary to keep track of the registered domain names. If a domain name fee is not paid, the domain name will eventually become available for registration. Typically, Customers pay the fees for their domain names that they are using so that they continually maintain ownership of the domain names. In contrast, Customers are less likely to pay the fees for their domain names that they are not using thereby releasing the domain names for others to register. While many domain names are registered for future use or for their speculated future value, the fee requirement is never the less the most important factor in making previously registered domain names available once more for registration.

Domain names are very valuable assets for their owners. Many domain names are worth thousands of dollars, some millions. Thus, it is critical for the domain owner to renew the domain name before it expires. Typically, domain names are registered for a period from one to ten years. Close to the end of the registration period the Registrar typically notifies the Customer that the domain name is about to expire and the Customer must renew it if the Customer wishes to maintain the registration of the domain name. The notification is usually sent via email. However, many customers use various technologies to combat unsolicited commercial advertisement via email also known as SPAM. Often important notifications from the Registrar to the Customer may be filtered out by the anti-SPAM tools and never get delivered to the Customer. In some cases a white list filtering is implemented on the Customer's system. In this case, only messages from trusted sources (so called white list) are delivered to the Customer's inbox. If the Registrar's email address is not on the white list, the Customer's system may reply with a verification message. It is likely that the employees of the Registrar would never read this verification message because the verification message may be received into an unmonitored email account.

FIG. 1 depicts a typical setting, where a Customer 105 receives a Notification Message 115 from a Registrar 120. The Notification Message 115 is sent by a Registrar's Server 125 to a Customer's Inbox 110 via email.

If the Customer implements an Email Filter 230, as shown in FIG. 2, some messages will be filtered out and moved to a SPAM Folder 235 (in some embodiments they may be simply deleted).

Further, as demonstrated in FIG. 3, if the Email Filter 230 maintains a white list and the Registrar's email address is not on that list, the Email Filter 230 would send a Verification Message 340 to the Registrar 120. In many cases the Verification Message 340 will be received by the Registrar 120 in an Unmonitored Email Account 345, and as a result lost. If the Email Filter 230 does not receive a response to the Verification Message 340, it will not deliver the Notification Message 115 to the Inbox 110.

These and various other anti-SPAM technologies impose the risk of not delivering the notification messages to the Customer and this in turn creates the risk to the Customer of losing the domain name. Additional concerns are that the domain name owners can change their email addresses, lose access to their email accounts, or voluntarily stop checking them. These may all lead to the loss of the domain name as well.

Therefore, new systems and processes are needed to overcome the limitations of the current systems and processes. It is desired to create a system and method that allow notification of Customers with important information from their Registrar.

SUMMARY OF THE INVENTION

The limitations cited above and others are substantially overcome through the systems and methods disclosed herein. The systems and methods of the present invention allow notification of the Customer with important information from the Registrar.

The disclosed system creates a Communication Link between a Customer's Computer and a Registrar's Server that allows the Registrar to provide important information to the Customer.

The methods of present invention call for installing Communication Software on the Customer's Computer, setting up accounts for accessing the messages on the Registrar's Server, accessing the messages, and notifying the Customer that new messages are available for viewing.

The proposed systems and methods would allow Customers to reduce the risk of loosing their domain names. If the Customer ordered additional services from the Registrar that are paid on recurring bases, such as hosting, website promotion, virus protection, SPAM protection, etc., the systems and methods of the present invention would make sure that the Customer receives a notification to renew the service before its expiration date and this guaranties uninterrupted services.

The above features and advantages of the present invention will be better understood from the following detailed description taken in conjunction with the accompanying drawings.

DETAILED DESCRIPTION AND PREFERRED EMBODIMENT

Figure 1:
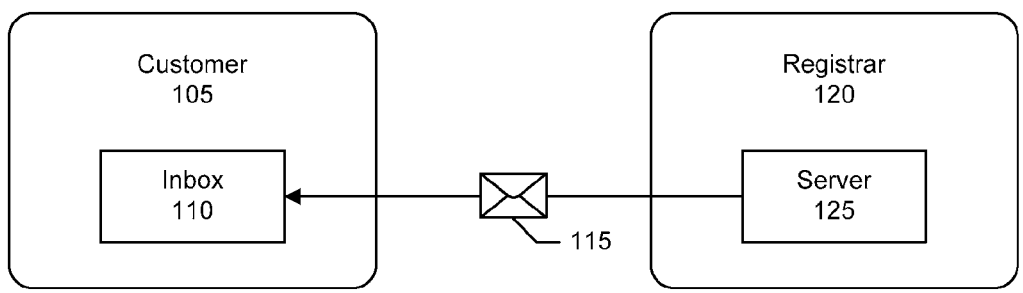
FIG. 1 represents a block diagram of a prior art system, which allows a Customer to receive a notification message from a Registrar via email.
Figure 2:
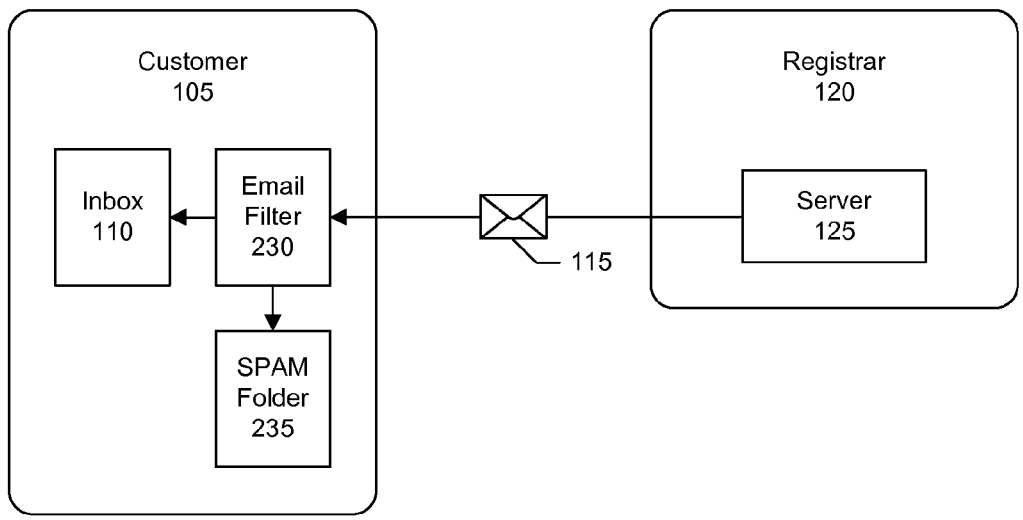
FIG. 2 represents a block diagram of a prior art system, which implements an Email Filter that filters out some of the messages to a SPAM Folder.
Figure 3:
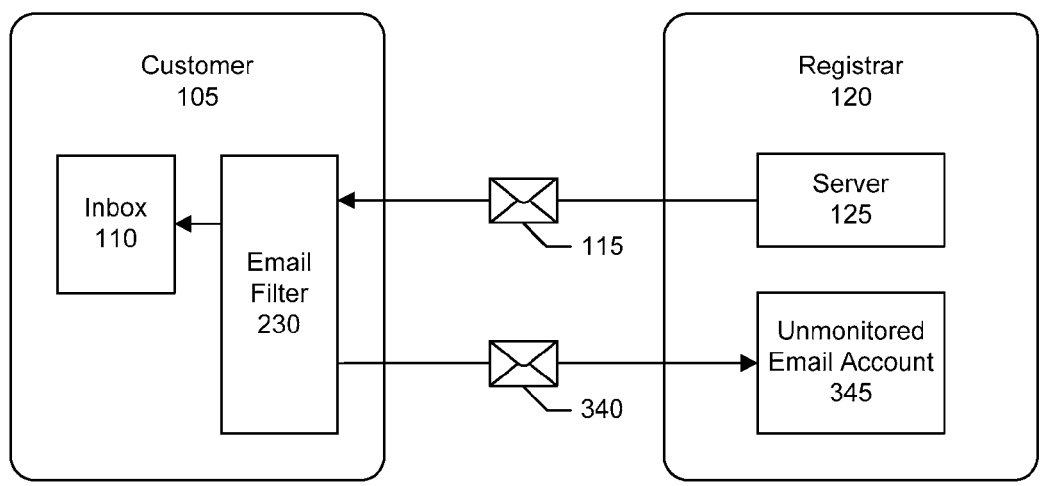
FIG. 3 represents a block diagram of a prior art system, which implements an Email Filter with white list capabilities.

The present invention will now be discussed in detail with regard to the attached drawing figures which were briefly described above. In the following description, numerous specific details are set forth illustrating Applicant's best mode for practicing the invention and enabling one of ordinary skill in the art to make and use the invention. It will be obvious, however, to one skilled in the art that the present invention may be practiced without many of these specific details. In other instances, well-known machines and method steps have not been described in particular detail in order to avoid unnecessarily obscuring the present invention. Unless otherwise indicated, like parts and method steps are referred to with like reference numerals.

Figure 4:
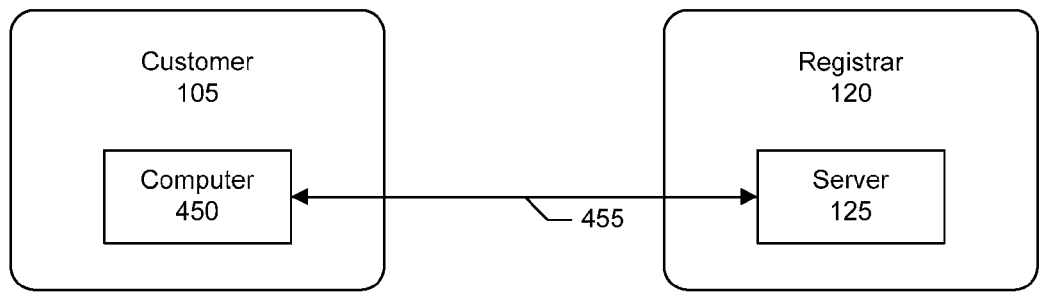
FIG. 4 represents a simplified block diagram of a system of the present invention, which allows establishing a communication link between a Customer's Computer and a Registrar's Server.

FIG. 4 depicts a system in accordance with the teachings of the present invention. The system includes a Customer 105, a Customer's Computer 450, a Registrar 120, a Registrar's Server 125, and a Communication Link 455.

Typically the Customer 105 is an individual in his own capacity or representative of a company or organization. The Computer 450 is a computing device or devices used by the Customer 105. The Registrar 120 is an entity authorized to register Internet domain names with a Registry on behalf of a Registrant. The Server 125 is a combination of hardware and software, maintained by the Registrar 120. The Communication Link 455 is a channel for exchanging electronic messages. The Communication Link 455 may be established through a computer network, which may include Local Area Network (LAN), Wide Area Network (WAN), and global area network, such as the Internet, or combinations thereof. If secure connection is desirable, the Secure Sockets Layer (SSL) or similar technology may be used to encrypt the signal.

Figure 5:
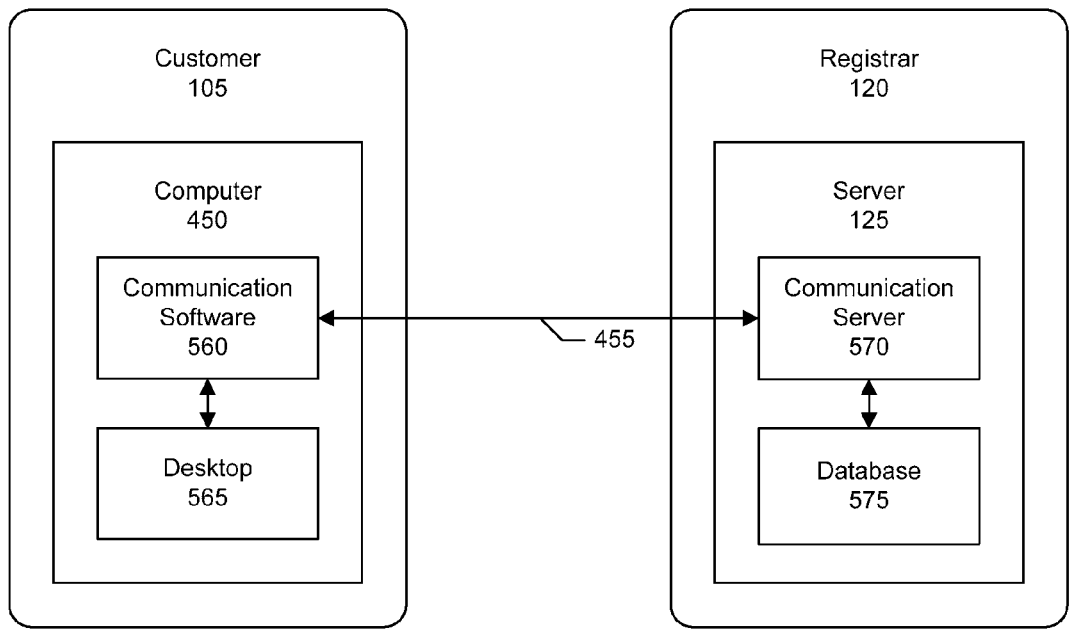
FIG. 5 represents a detailed block diagram of a system of the present invention.

FIG. 5 demonstrates possible elements of the Computer 450 and the Server 125. The Computer 450 comprises a Communication Software 560 and a Desktop 565. The Server 125 comprises a Communication Server 570 and a Database 575.

The Communication Software 560 is responsible for establishing and maintaining connection to the Server 125 and checking for new messages on the Server 125. The Communication Software 560 typically runs in the background on the Computer 450. The Communication Software 560 may (1) check that new messages are available on the Server 125, (2) check how many messages are available on said Registrar's Server, (3) download headers of the messages to the Computer 450, (4) download full messages to the Computer 450, or (5) perform any combinations thereof.

Figure 8:
FIG. 8 shows a sample of a computer popup message that can be used to notify a Customer about new messages from a Registrar.
Figure 9:
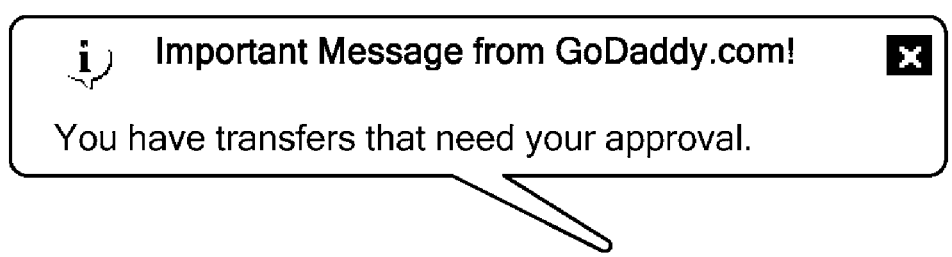
FIG. 9 shows a sample of a computer balloon message that can be used to notify a Customer about new messages from a Registrar.

The Desktop 565 is typically a video display that provides, inter alia, visual information to the Customer 105 about new messages available from the Registrar 120. When new messages are received from the Registrar 120, the Communication Software 560 notifies the Customer 105 through the Desktop 565. The Customer 105 may be notified via standard computer popup messages as shown in FIG. 8 or via balloon messages as shown in FIG. 9.

Referring to FIG. 5, the Communication Server 570 is a combination of hardware and software that checks the records in the Database 575, generates new messages, and puts new messages to a queue for the Customer's Computer 450 to pick up. The Database 575 holds information on customers' accounts. This information may include domain names registered to the Customer 105, their expiration dates, additional services purchased by the customer, billing and payment information, etc.

It should be clear to a person skilled in the art that a single customer described in the system of the present invention is a simplification and typically the system will comprise of plurality of customers.

Figure 6:
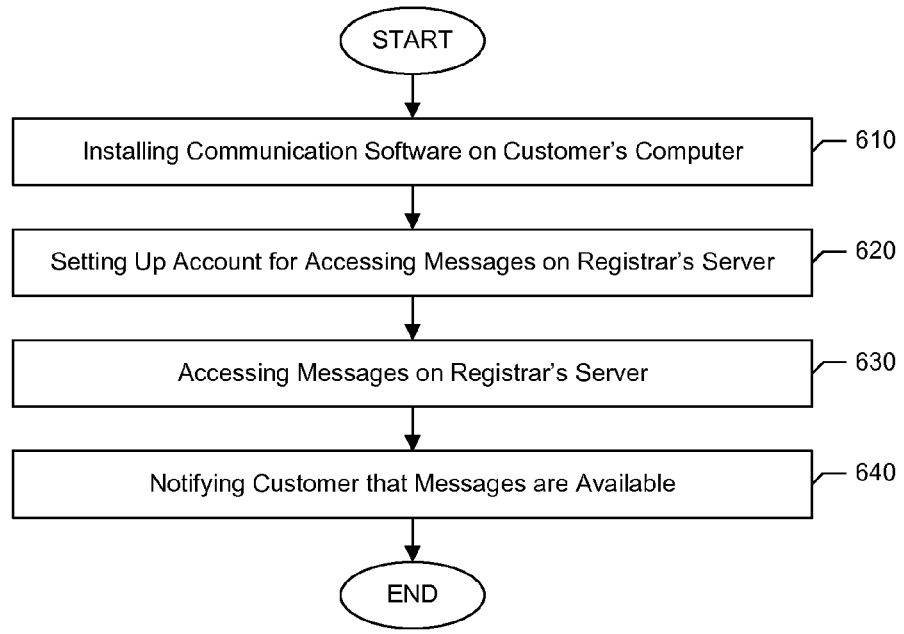
FIG. 6 represents a flowchart illustrating a method of using the system of FIGS. 4 and 5.

FIG. 6 demonstrates a method of using the present invention. First, it's necessary to install the Communication Software on the Customer's Computer (Step 610). The Communication Software can be downloaded to the Customer's Computer from the Registrar's website via the Internet connection or may be shipped to the Customer. After the Communication Software is installed the Customer needs to setup an account for accessing the messages on the Registrar's Server (Step 620). Typically the Customer will already have an account with the Registrar. If an account exists, the Customer will provide a login name and a password to the Communication Software. If no account exists, the Customer may create a new one. The use of a login name and a password is needed in this step for the authentication of the Customer with the Registrar's Server. Further the Communication Software may remember the Customer's login name and password. The login name and password may be saved on a local Computer or network in encrypted form. Then, the Communication Software may establish connection to the Registrar's Server and check for new messages (Step 630). The Communication Software will provide Customer's login name and password to the Registrar's Server. If the Registrar's Server recognizes the Customer's login name and password, it will allow access to the messages. If the Communication Software detects new messages on the Server, it will notify the Customer that new messages are available (Step 640). The visual notification to the Customer may be accompanied by a sound notification as well.

The messages generated by the Communication Server may conform to the Really Simple Syndication (RSS) specification. RSS is a Web content syndication format. RSS is a dialect of Extensible Markup Language (XML).

The messages can be downloaded onto the Customer's Computer or viewed online on the Registrar's Server.

A single customer can have multiple accounts. The Communication Software can be programmed to check messages from multiple accounts.

The described system is a "pull" type system. The Registrar publishes messages on its Server and Customer's Communication Software is "pulling" them from the specified location. However, alternative "push" systems can be envisioned, where the Registrar's Communication Server knows the location of the Customer's Computer on the network and "pushes" the messages to the Customer's Computer.

Figure 7:
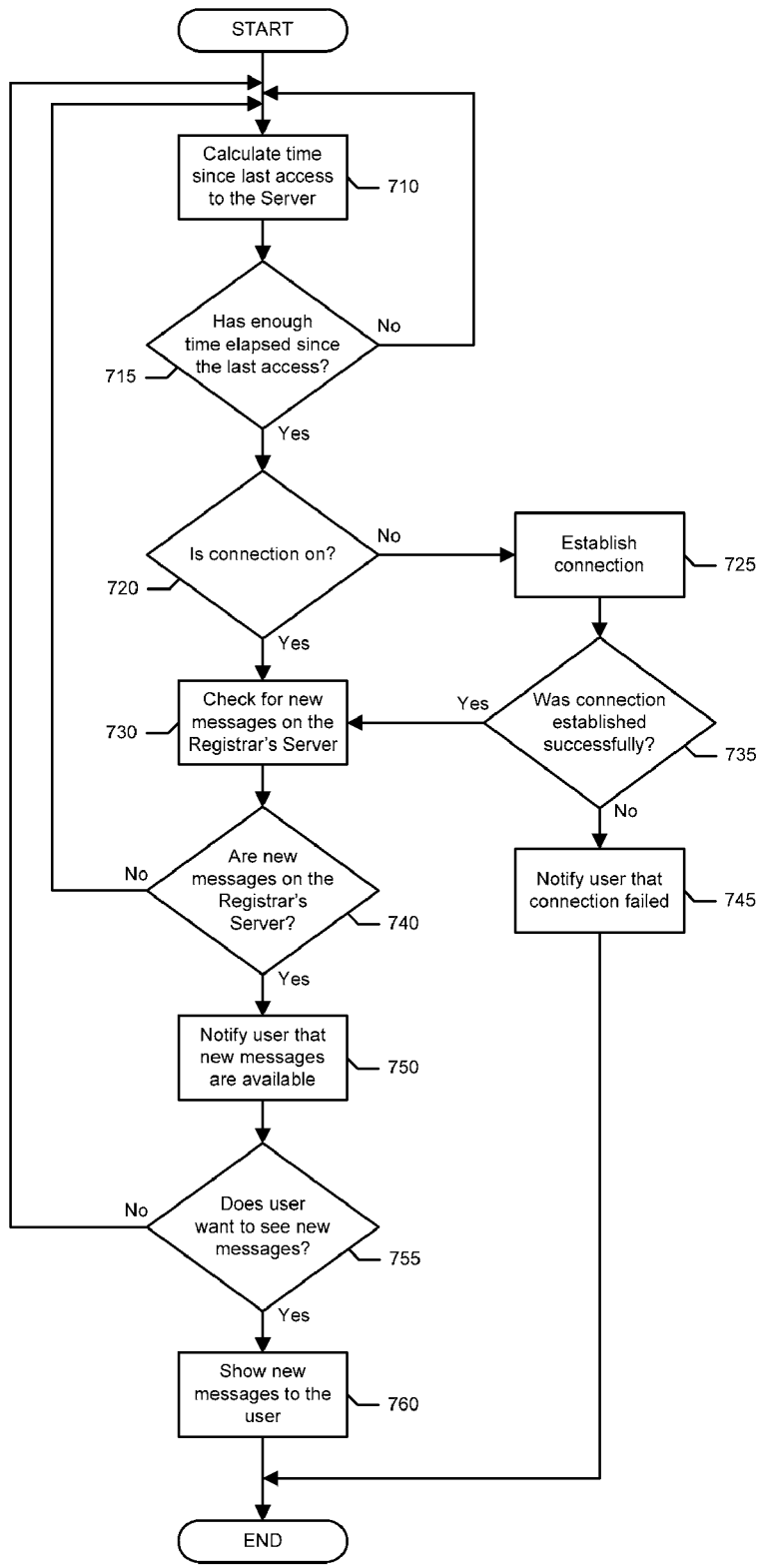
FIG. 7 represents a flowchart illustrating a preferred method of using the system of FIGS. 4 and 5.

FIG. 7 shows the preferred method of using the present invention. This method shows how the Communication Software may check for new messages on the Registrar's Server. This method assumes that the Communication Software was installed on the Customer's Computer and at least one account was setup in the Communication Software for accessing the messages on the Registrar's Server.

The method begins with calculating the time interval since the Communication Software accessed the Registrar's Server for the last time (Step 710). If the calculated time interval is equal to or greater than a predetermined time interval (Step 715), then proceed to check the connection, otherwise the process returns to the beginning of the method. The predetermined time interval establishes how often the Communication Software checks for new messages on the Registrar's Server (e.g. every 5 minutes). This time interval may be preset in the installation of the Communication Software and may be changed as one of the options by the Customer.

Next, the Communication Software may check if a connection is available between the Registrar's Server and the Customer's Computer (Step 720). The connection may have multiple layers: general Internet connection, general connection to the Registrar's Server, and secure connection to the Registrar's Server after the Registrar's Server authenticated the Customer's login name and password. All layers of connection may be established for the Communication Software to be able to check messages on the Registrar's Server. If the connection is not on, the Communication Software may attempt to establish the connection (Step 725) and then check to see if the connection was established (Step 735). If establishing the connection failed, the user will be notified that the connection failed (Step 745) and the method would end. Alternatively, the Communication Software may try to reestablish the connection after a set time interval (not shown in the flowchart).

If the connection is on or was successfully established, the Communication Software may check for new messages on the Registrar's Server (Step 730). If there are no new messages on the Registrar's Server (Step 740), the method may restart from the beginning Otherwise, the Communication Software notifies the Customer that new messages are available (Step 750). The messages may be downloaded to the Customer's Computer or be viewed on the Registrar's website. If the Customer wants to see the messages (Step 755), the Communication Software may show them to the Customer through the Desktop (Step 760), otherwise the method may restart from the beginning.

Further, if the Customer decides to act accordingly to the information provided in the message, the Customer may click on the message or on any other provided link or button and the Communication Software may open an Internet browser application and show the appropriate page of the Registrar's website (not shown on the flowchart).

The method demonstrated in FIG. 7 can repeat itself unlimited number of times (not shown on the flowchart) as long as the Communication Software is running on the Customer's Computer.

The messages can be removed from the list of available messages by a variety of methods. The Customer may manually delete the message after it was read. The Registrar may delete the message if it is no longer needed; for example if the Customer renewed her/his domain names, the renewal notification massage can be deleted. In the embodiments where the messages are entirely stored on the Registrar's Server, the Registrar may simply delete the message from the Communication Server. If the messages or their headers are stored on the Customer's Computer, the Registrar's Server may send a delete message that would not be shown to the Customer but will be treated by the Communication Software as an instruction to remove specified messages. For this approach each message may have a unique identifying number (or alphanumeric string), which the Communication Software may recognize when it deletes the messages. In another embodiment the messages may be assigned an expiration date after which they will be deleted or if there is no expiration date the messages may be deleted after a set time interval. The set time interval for deleting the messages may be changed by the Customer as one of the options.

Alternatively the messages to be deleted may be marked as "completed" or moved to another location (e.g. folder "Completed" or "Done") if the Customer desires to maintain an archive of previously received messages.

The Customer may decide what type of messages she/he wants to receive. The Communication Software may provide the options screen where the Customer may select/deselect the types of messages. Types of messages may include: pending domain name transfers, domain name renewal notices, additional products and services renewal notices (hosting, email, web promotion, etc.), failed billing attempts, notifications that Customer's account has been accessed, notices of new products and services from the Registrar or its affiliates, and others.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The invention claimed is:

1. A system comprising:
a) a registrar server computer operated by a registrar, the register server computer comprising a first processor operatively coupled to a first memory containing a first set of instructions executable by the first processor, the first set of instructions comprising:
b) a registrar website hosted on the registrar server computer and comprising:
  i) a domain name registration web page configured to receive from a registrant a domain name registration request;
  ii) a registrar message view web page configured to display one or more registrar messages generated responsive to one or more upcoming domain name expirations, wherein the one or more registrar messages are not email messages;
  iii) a domain name renewal web page displayed responsive to the registrant clicking on a link or a button in the one or more registrar messages; and
  iv) a registrar message deletion web page configured to receive from the registrant a selection of an event from among a plurality of event options, wherein responsive to the event, one of the one or more registrar messages associated with an identifying number or an alphanumeric string is deleted;
c) a communication server software hosted on the registrar server computer and configured to:
  i) generate the one or more registrar messages responsive to the one or more upcoming domain name expirations; and
  ii) create a queue for the one or more registrar messages in anticipation of a registrar message request;
d) a database on the registrar server computer storing in association one or more domain names registered by the registrant, an expiration date for each of the one or more domain names, the one or more registrar messages and the identifying number or the alphanumeric string for each of the one or more registrar messages;
e) a registrant client computer operated by the registrant, the registrant client computer comprising a second processor operatively coupled to a second memory containing a second set of instructions executable by the second processor, the second set of instructions comprising:
f) a communication software configured to:
  i) establish a direct communication link, after download and installation of the communication software on the registrant client computer, between the communication software and the communication server software, wherein the communication software, the communication server software and the direct communication link do not interact with email or anti-SPAM technologies;
  ii) request the one or more registrar messages from the queue without interacting with email or anti-SPAM technologies and responsive to the communication software determining that the queue contains at least one registrar message; and
  iii) display a popup message or a balloon message on the registrant client computer, wherein the popup message or the balloon message alerts the registrant of the at least one registrar message and wherein the popup message or the balloon message does not interact with email or anti-SPAM technologies.

2. The system of claim 1 wherein the event comprises the registrant manually deleting the one of the one or more registrar messages.

3. The system of claim 1 wherein the event comprises the registrant renewing the one or more domain names, wherein the one of the one or more registrar messages is no longer needed.

4. The system of claim 1 wherein the event comprises the registrar server computer sending a delete message to the registrant client computer, wherein the delete message is treated by the communication software on the registrant client computer as intended to remove the one of the one or more registrar messages and any associated messages and headers stored on the registrant client computer.

5. The system of claim 4 wherein the associated messages and headers stored on the registrant client computer each have a second unique identifying number or a second alphanumeric string.

6. The system of claim 1 wherein the event comprises an expiration of an expiration date assigned to the one of the one or more registrar messages, after which the one of the one or more registrar messages will be deleted from the registrar server computer.

7. The system of claim 1 wherein the event comprises a passing of a set time interval assigned to the one of the one or more registrar messages, after which the one of the one or more registrar messages will be deleted from the registrar server computer.

8. The system of claim 1 wherein the registrar server computer is configured to archive one or more previously received messages.

9. The method of claim 8 wherein the archiving is accomplished by moving the one or more previously received messages to a folder designated to hold one or more completed messages.

10. A method comprising the steps of:
 a) registering one or more domain names responsive to a registrant requesting the one or more domain names from a domain name registration web page on a registrar website hosted on a registrar server computer operated by a registrar;
 b) generating, by a communication server software hosted on the registrar server computer and responsive to one or more upcoming domain name expirations, one or more registrar messages, wherein the one or more registrar messages are not email messages and wherein the one or more registrar messages are placed in a queue in anticipation of a registrar message request;
 c) storing in association, in a database on the registrar server computer, one or more domain names registered by the registrant, an expiration date for each of the one or more domain names, the one or more registrar messages and an identifying number or an alphanumeric string for each of the one or more registrar messages;
 d) downloading a communication software, as requested by the registrant, from the registrar server computer to a registrant client computer;
 e) receiving from the communication software, after installation of the communication software on the registrant client computer, a request for a direct communication link between the communication software and the communication server software, wherein the communication software, the communication server software and the direct communication link do not interact with email or anti- SPAM technologies;
 f) receiving from the communication software, without interacting with email or anti-SPAM technologies, a determination of whether the queue contains at least one registrar message;
 g) displaying a popup message or a balloon message on the registrant client computer, wherein the popup message or the balloon message alerts the registrant of the at least one registrar message and wherein the popup message or the balloon message does not interact with email or anti-SPAM technologies;
 h) displaying the registrar message on a registrar message view web page on the registrar web site responsive to the registrant clicking on the popup message or the balloon message;
 i) renewing the one or more domain names responsive to the registrant requesting renewal of the one or more domain names on a domain name renewal web page on the registrar web site; and
 j) receiving from the registrant, using a registrar message deletion web page on the registrar website, a selection of an event from among a plurality of event options, wherein responsive to the event, one of the one or more registrar messages associated with an identifying number or alphanumeric string is deleted responsive to the event.

\* \* \* \* \*